(12) United States Patent
Robinson et al.

(10) Patent No.: US 7,133,648 B1
(45) Date of Patent: Nov. 7, 2006

(54) BIDIRECTIONAL MULTI-GIGABIT TRANSCEIVER

(75) Inventors: Moises E. Robinson, Austin, TX (US); Normand T. Lemay, Jr., Minneapolis, MN (US); William C. Black, Ames, IA (US)

(73) Assignee: Xilinx, Inc., San Jose, CA (US)

( * ) Notice: Subject to any disclaimer, the term of this patent is extended or adjusted under 35 U.S.C. 154(b) by 598 days.

(21) Appl. No.: 10/454,445

(22) Filed: Jun. 3, 2003

(51) Int. Cl.
*H04B 1/40* (2006.01)

(52) U.S. Cl. .......................... 455/88; 455/76; 455/86; 455/127.4; 455/118; 455/180.3; 375/220; 375/288; 375/232; 375/346; 370/252; 370/286

(58) Field of Classification Search ............... 455/86, 455/78, 127.4, 118, 180.3; 375/288; 370/286, 370/252
See application file for complete search history.

(56) References Cited

U.S. PATENT DOCUMENTS

| | | | |
|---|---|---|---|
| 4,717,914 A * | 1/1988 | Scott ........................ 370/451 |
| 5,079,770 A * | 1/1992 | Scott ........................ 370/536 |
| 6,434,187 B1 * | 8/2002 | Beard et al. ................ 375/219 |
| 6,516,184 B1 * | 2/2003 | Damgaard et al. ........... 455/86 |
| 6,567,653 B1 * | 5/2003 | Sanders ..................... 455/126 |
| 6,577,689 B1 * | 6/2003 | Smith et al. ................ 375/354 |
| 6,658,237 B1 * | 12/2003 | Rozenblit et al. ............ 455/83 |
| 6,763,060 B1 * | 7/2004 | Knapp ....................... 375/219 |
| 6,920,622 B1 * | 7/2005 | Garlepp et al. ............... 716/6 |
| 6,963,616 B1 * | 11/2005 | Chan ......................... 375/257 |

* cited by examiner

*Primary Examiner*—Marceau Milord
(74) *Attorney, Agent, or Firm*—W. Eric Webostad (57) ABSTRACT

Method and apparatus for a bidirectional transceiver cell is described. Each bidirectional transceiver cell has a transmitter and a receiver, where the transmitter and the receiver share a phase-locked loop. The bidirectional transceiver cell is configured to act as either a transmitter or a receiver. The bidirectional transceiver cell is for multi-gigabit data rates.

28 Claims, 8 Drawing Sheets

BIDIRECTIONAL MULTI-GIGABIT TRANSCEIVER

FIELD OF THE INVENTION

One or more aspects of the invention relate generally to bidirectional transceivers, and more particularly to multi-gigabit bidirectional transceivers.

BACKGROUND OF THE INVENTION

Use of current-mode logic ("CML") technology is becoming increasingly popular for high-speed communication, especially point-to-point communication. CML is especially attractive in applications with communication rates equal to or in excess of a gigabit per second. However, CML interfaces heretofore have had dedicated data paths. For example, a CML interface conventionally includes a plurality of cells. Of those cells, each cell included dedicated circuitry, where some of the cells were receivers and others of the cells were transmitters. Thus, each cell of a CML interface was either a transmitter-only cell or a receiver-only cell as determined by the manufacturer of the integrated circuit containing such cells. However, this inflexibility not only imposes application design constraints, it further requires dedicated phase locking circuitry, such as a phase-locked loop ("PLL") for each of the cells. Thus, if there were 64 cells, there would be 64 or more separate PLLs.

Accordingly, it would be both desirable and useful to provide an interface cell that overcomes one or more of the above-mentioned limitations associated with prior interface cells.

SUMMARY OF THE INVENTION

An aspect of the invention is a bidirectional transceiver. The transceiver comprises: a transmit data path; a receive data path coupled to the transmit data path at an input/output node; and a phase-locked loop coupled between the transmit data path and the receive data path to provide a first timing signal to each of the transmit data path and the receive data path. The bidirectional transceiver cell is configured to act either as a transmitter or a receiver. The transmit data path and the receive data path are for at least multi-gigabit data rates.

Another aspect of the invention is a serializer-deserializer (SERDES) transceiver. The transceiver comprises: bidirectional transceiver cells. Each bidirectional transceiver of the bidirectional transceiver cells has a transmitter and a receiver that share a phase-locked loop. Each of the bidirectional transceiver cells is configurable to either transmit or receive data for at least multi-gigabit data rates.

Another aspect of the invention is a method for configuring an integrated circuit having configurable logic. The method comprises: providing a plurality of bidirectional transceiver cells with the integrated circuit; providing a bitstream to configure the configurable logic; and configuring the configurable logic to select for transmit data paths a first portion of the plurality of bidirectional transceiver cells and to select for receive data paths a second portion of the plurality of bidirectional transceiver cells. The transmit data paths and the receive data paths are for multi-gigabit or higher data rates.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1A:
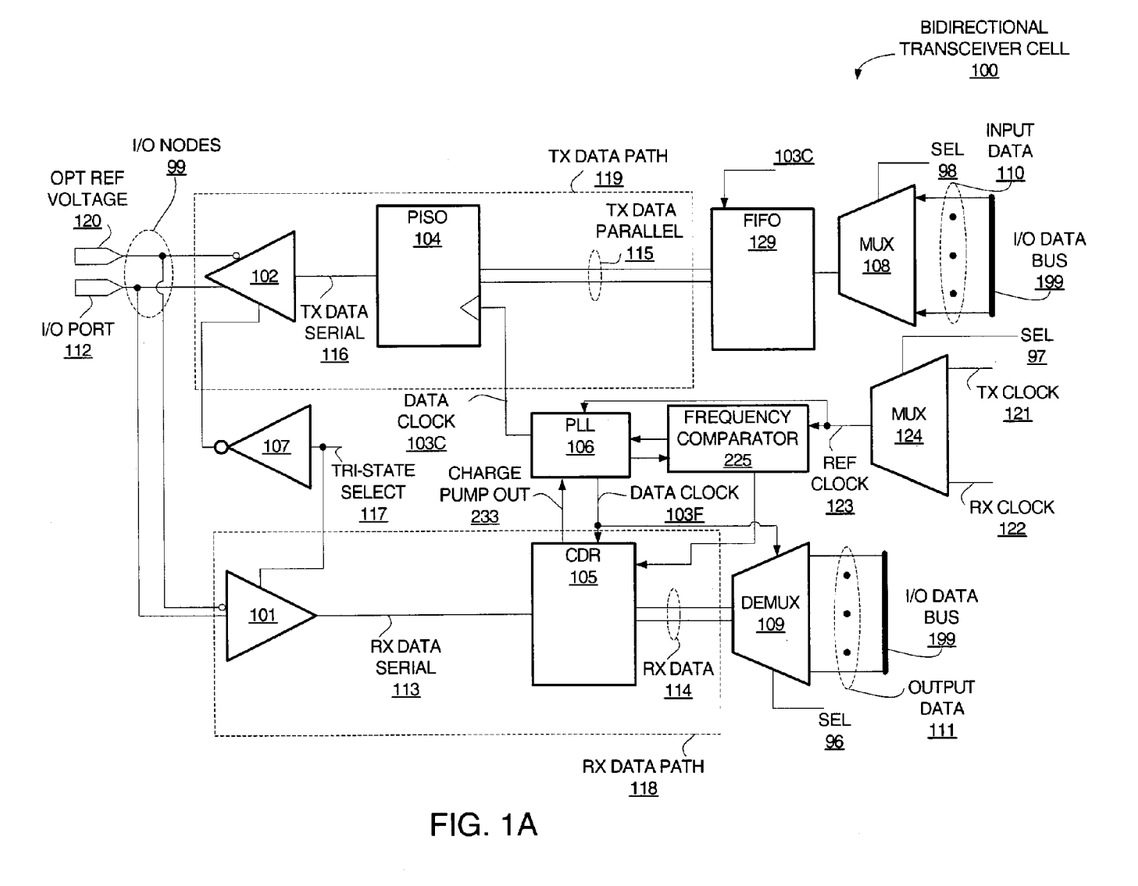
FIG. 1A is a high-level schematic/block diagram depicting an exemplary embodiment of a bidirectional transceiver cell.

FIG. 1A is a high-level schematic/block diagram depicting an exemplary embodiment of a bidirectional transceiver cell 100. Bidirectional transceiver cell 100 includes a transmit data path 119 and a receive data path 118. Transmit data path 119 and receive data path 118 are connected to one another at an input/output node, and optionally may be connected to one another at two input/output nodes 99, and may be coupled to a common input/output data bus, such as I/O data bus 199, for receiving input and providing output data, such as input data 110 and output data 111, respectively. One of nodes 99 is coupled to input/output data port 112, and the other of nodes 99 is optionally coupled to a reference voltage 120. Input/output port 112 is for a differential signal. Thus, transmit data path 119 and receive data path 118 are for multi-gigabit data rates, such as those associated with current-mode logic ("CML"). Input/output port 112 and reference voltage 120 are coupled to outputs of tri-state buffer 102 and to inputs of tri-state buffer 101. Buffers 101 and 102 may be inversely tri-stated with respect to one another responsive to tri-state select signal 117, which is connected to buffer 101 and coupled to buffer 102 through inverter 107. In this configuration, either buffer 101 or 102 is active and the other buffer of buffers 101 and 102 is tri-stated. Configurable logic may be configured to provide tri-state select signal 117 to configure bidirectional transceiver cell 100 as either a receiver or a transmitter.

Input to buffer 102 is transmit data signal 116, which is a serial data stream. Transmit data signals 115 are provided as input to first-in, first-out buffer ("FIFO") 129 and then provided in the form of parallel data streams to parallel-in serial-out ("PISO") 104, from which transmit data signal 116 is provided as output. FIFO 129 and PISO 104 are synchronously operated responsive to data clock signal 103C from phase-locked loop ("PLL") 106. Optionally, a multiplexer ("MUX") 108 may front end transmit data signals 115. MUX 108 may be implemented to select a portion of input data signals 110 to provide transmit data signals 115. This selection may be made in response to input data select signal 98. Configurable logic may be configured to provide input data select signal 98 to configure bidirectional transceiver cell 100. Thus, bidirectional transceiver cell 100 may be configured as a transmitter for transmitting selected input data signals 110.

PLL 106 is coupled between transmit data path 119 and receive data path 118 to provide a timing signal to each of transmit data path 119 and receive data path 118, namely, data clock signal 103C and data clock signal 103F, respectively. Notably, data clock signal 103C and data clock signal 103F (collectively and singly referred to as "data clock signal 103") are obtained from output of the same voltage controlled oscillator ("VCO"), namely, VCO 216 of FIG. 2. However, data clock signal 103C and data clock signal 103F may be different signals, where data clock signal 103F is more refined than data clock signal 103 or where data clock signals 103C and 103F are generated from different reference clock signals.

A reference clock signal 123 is provided to a frequency comparator 225 and clock-data recovery circuitry ("CDR") 105. Operation of frequency comparator 225 is described in additional detail with reference to FIG. 2. In an embodiment, a reference clock signal 123 is provided as input to PLL 106 for either a transmit mode or a receive mode. In a transmit mode, VCO 216 of FIG. 2 of PLL 106 in response to reference clock signal 123 is used to provide a data clock signal 103C to PISO 104. In a receive mode, VCO 216 of FIG. 2 of PLL 106 is used to provide a data clock signal 103F in response to reference clock signal 123 and in response to receive data signal 113, as described in additional detail with reference to FIG. 2.

In another embodiment, where different reference clock signals are used for transmit and receive modes, reference clock signal 123 is front ended by MUX 124. MUX 124 receives as input a transmit clock signal 121 and a receive clock signal 122, either one of which may be selected responsive to clock select signal 97 to output from MUX 124 such selected signal as reference clock signal 123. Thus, in a transmit mode, data clock signal 103C is responsive to transmit clock signal 121, which is reference clock signal 123, and in a receive mode, data clock signal 103F is partially responsive to receive clock signal 122, which is reference clock signal 123. Notably, data clock signal 103F is partially responsive to receive data signal 113, as described below in additional detail with reference to FIG. 2. Configurable logic may be configured to provide clock select signal 97 to configure bidirectional transceiver cell 100, either as a transmitter for transmitting using transmit clock signal 121 or as a receiver for receiving using receive clock signal 122.

Receive data signal 113 is a serial data stream that is provided as input to CDR 105. CDR 105 is synchronously operated responsive to data clock signal 103F from VCO 216 of FIG. 2 forming a portion of PLL 106. Data clock signal 103F is associated with a data sampling rate for providing receive data signal(s) 114 as one or more output data streams responsive to implementation.

Figure 1B:
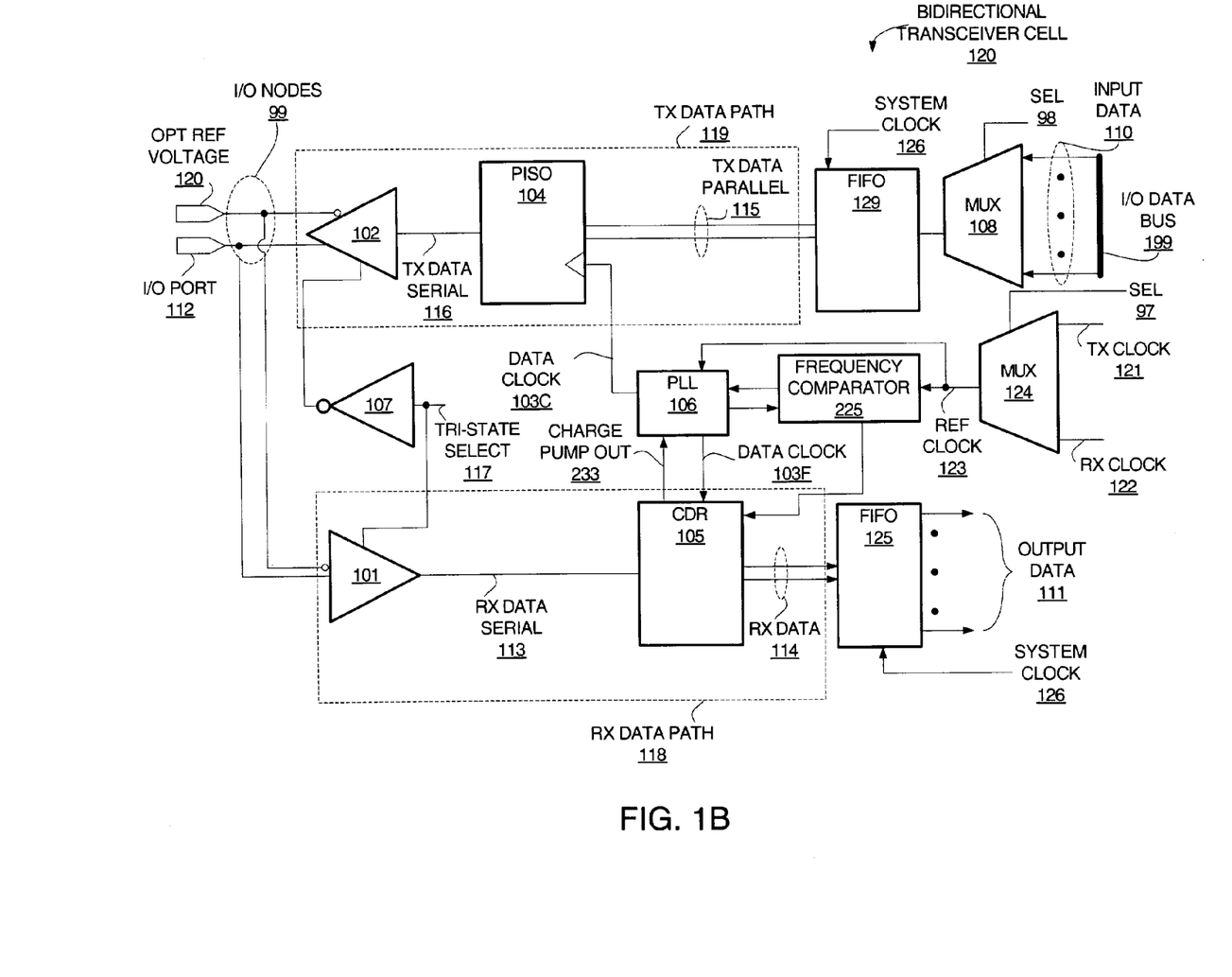
FIG. 1B is a high-level schematic/block diagram depicting another exemplary embodiment of a bidirectional transceiver cell.

The data sampling rate may be any of a variety of known data sampling rates, whole or fractional such as two-times ("2×") data sampling, one-times ("1×") data sampling, and one-half (0.5×) data sampling, among others. The rate at which data is sampled affects the number of receive data streams for receive data signal(s) 114. For example if a sufficiently high data sampling rate responsive to data clock signal 103F, receive data signals 114 are parallel data streams which need not be provided for demultiplexing, but may be provided to a first-in first-out buffer ("FIFO") 125, as shown in the high-level schematic/block diagram of FIG. 1B in which is depicted another exemplary embodiment of a bidirectional transceiver cell 120. In FIG. 1B, a system clock signal 126 may be provided to FIFO 125 for clocking out received data from received data signals 114 to provide output data signals 111.

Returning to FIG. 1A, if sampling rate is not sufficiently high so as to completely demultiplex received data of receive data signal 113, then CDR 105 may be back ended with a demultiplexer ("DEMUX") 109 for demultiplexing one or more receive data signals 114 for providing output data signals 111. Notably, receive data signal(s) 114 may be a single data stream or two or more parallel data streams. An output data select signal 96 may be used to adjust DEMUX 109 responsive to data sampling rate, namely, a higher data sampling rate will have less demultiplexing than a lower data sampling rate. Configurable logic may be configured to provide output data select signal 96 to configure bidirectional transceiver cell 100 for demultiplexing responsive to frequency of reference clock signal 123. Notably, data clock signal 103 optionally may be provided to DEMUX 109, for example for applications with a significant oversampling ratio where one or more clocks from a VCO are used for data alignment.

Additionally, data bus width is another variable that needs to be taken into account. Thus, the issue is whether data bus width is sufficiently wide to handle received data in a single clock cycle, or whether data needs to be processed over multiple clock cycles due to data bus width not be sufficiently wide to hand received data in a single clock cycle.

Figure 1C:
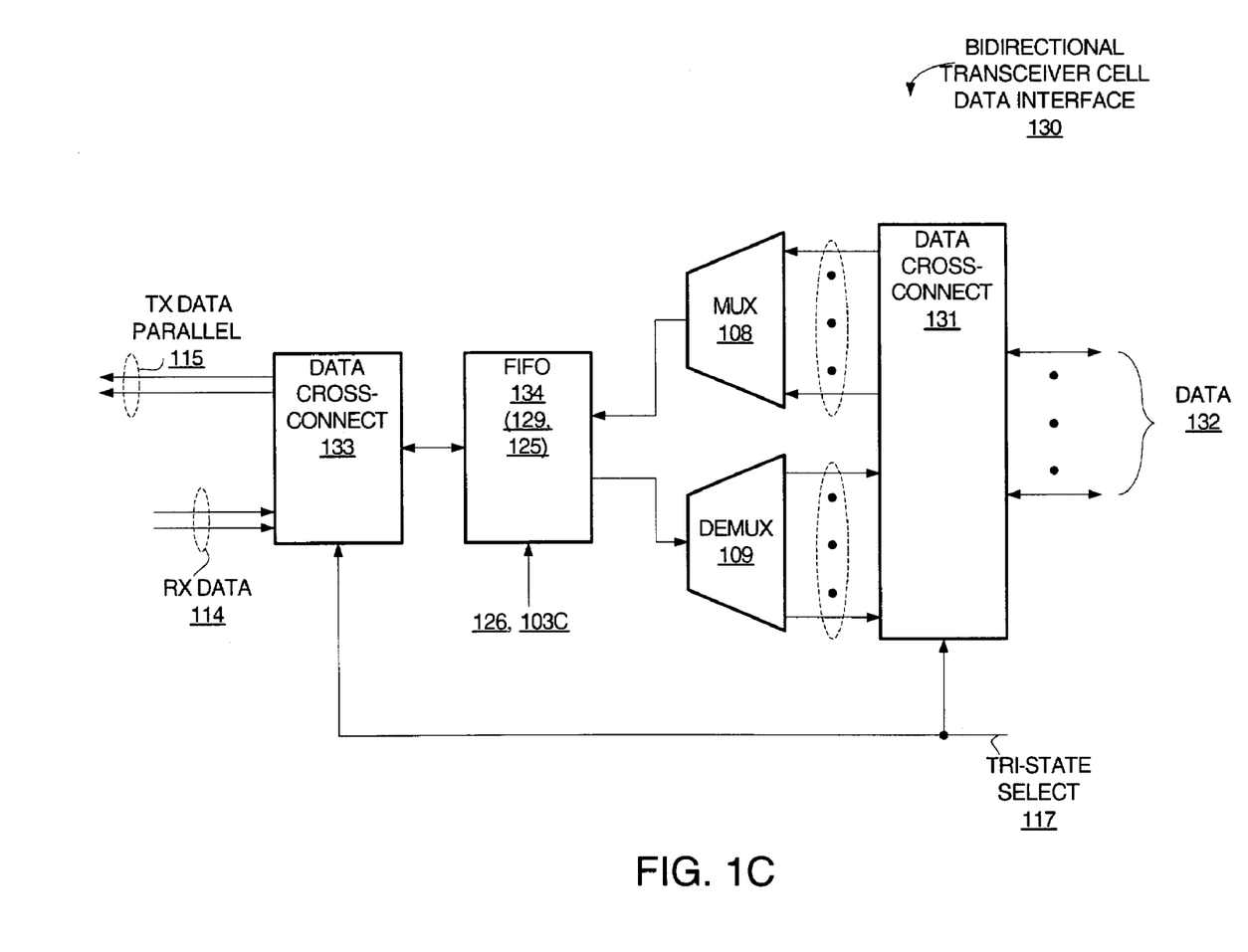
FIG. 1C is a high-level schematic/block diagram depicting an exemplary embodiment of a bidirectional transceiver cell data interface.

FIG. 1C is a high-level schematic/block diagram depicting an exemplary embodiment of a bidirectional transceiver cell data interface 130. Data interface 130 may form a portion of a bidirectional transceiver cell 100 or 120. Data 132 is either provided to or obtained from data cross-connect 131 responsive to whether a bidirectional transceiver cell is set to transmit or receive, respectively. Transmit data signals 115 or receive data signals 114 are either provided from or sent to data cross-connect 133 responsive to whether a bidirectional transceiver cell is set to transmit or receive, respectively. A configuration control signal, such as tri-state select signal 117, may be provided to data cross-connects 131 and 133 for selecting either a transmit or a receive mode for both. All other details regarding bidirectional transceiver cell data interface 130 are as described above with respect to bidirectional transceiver cells 100 and 120, and thus are not repeated. However, notably in this embodiment a single FIFO 134 is used with different input and output interfaces to effectively provide FIFOs 129, 125 of FIG. 1B, where a clock signal 126 or 103C is respectively applied to FIFO 134 for a receive mode or a transmit mode.

Figure 2:
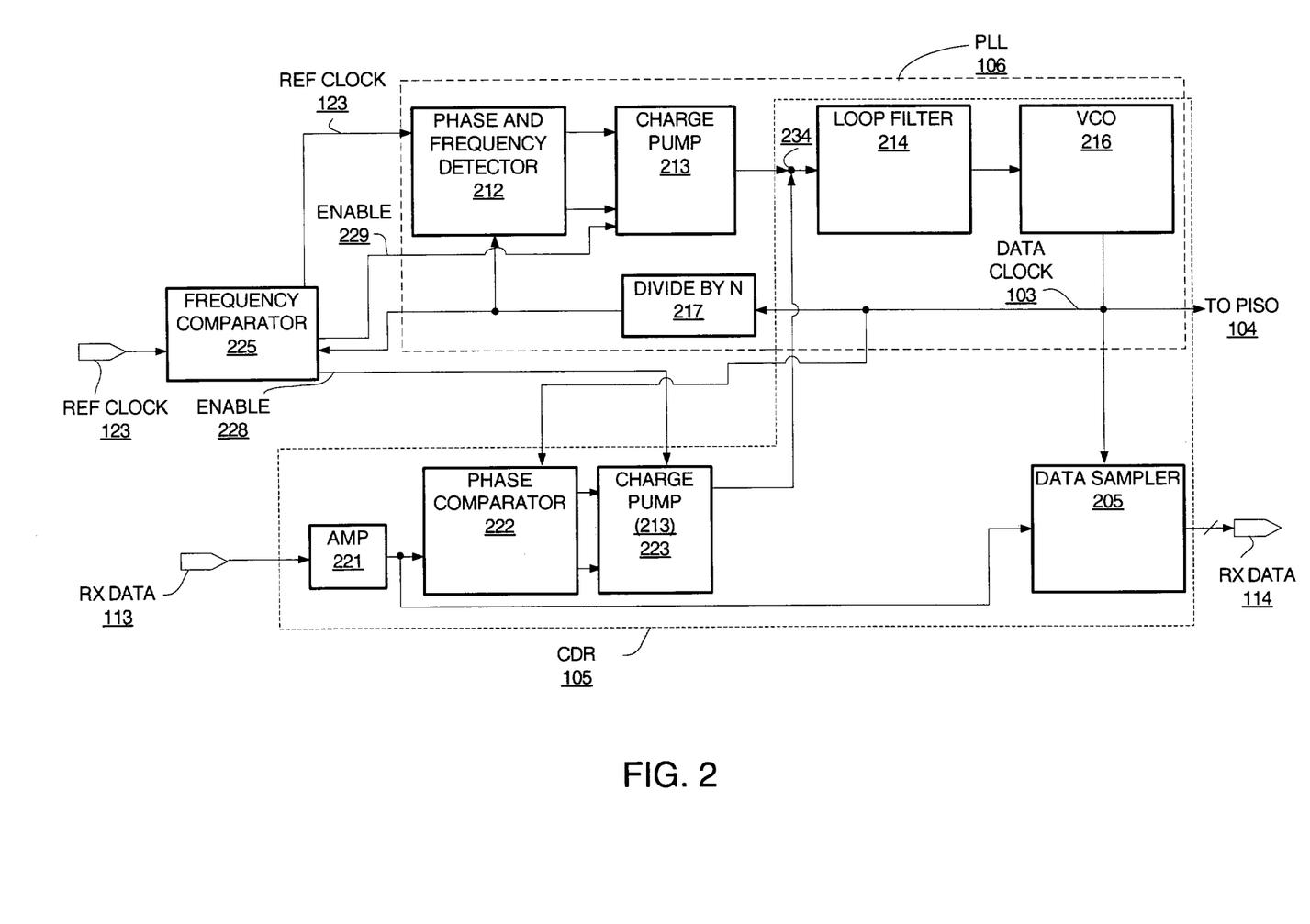
FIG. 2 is a block diagram depicting an exemplary embodiment of a portion of the bidirectional transceiver cells of FIGS. 1A and 1B.

FIG. 2 is a block diagram depicting an exemplary embodiment of a portion of bidirectional transceiver cells 100 or 120 of FIGS. 1A and 1B, respectively. PLL 106 includes a phase and frequency detector 212, a charge pump 213, a loop filter 214 and VCO 216. CDR 105 includes an amplifier 221, a phase comparator 222, a data sampler 205, a charge pump 223, loop filter 214 and VCO 216. Notably, a single charge pump 213 may be used with different inputs and output gains, as parenthetically indicated; however, for purposes of clarity separate charge pumps 213 and 223 are described. Accordingly, loop filter 214 and VCO 216 are shared components of PLL 106 and CDR 105. Optionally, a separate loop filter (not shown) may be included as part of CDR 105, such that only VCO 216 is shared between PLL 106 and CDR 105.

Data sampler 205 may include any of a variety of known configurations for sampling data responsive to a timing signal. For example, data sampler 205 may be a shift register.

Frequency comparator 225 receives a reference clock signal 123. Frequency comparator 225 passes reference clock signal 123 to phase and frequency detector 212, and frequency comparator 225 sends to charge pump 213 an enable signal 229 to activate charge pump 213. Additionally, frequency comparator sends to charge pump 223 a disable signal 228 to ensure charge pump 223 is not activated. From phase and frequency detector 212, either an up or down output is provided to charge pump 213 responsive to a comparison of reference clock signal 123 to any, if any, input to phase and frequency detector 212 from divide by N circuit 217. Output from charge pump 213 is provided to loop filter 214, the filtered output of which is provided to VCO 216. In response to receiving a voltage input, VCO provides data clock signal 103 as output. Data clock signal 103 is provided to divide by N circuit 217 for feedback input to phase and frequency detector 212.

Negative feedback, such as data clock signal 103, from VCO 216 output has a frequency, which is divided by divide by N ("frequency divider") 217. PLL 106 integrates phase error, if any, between a periodic reference input, such as reference clock signal 123, and a frequency divided VCO output. This integration adjusts VCO output frequency. When PLL 106 is locked, VCO 216 generates an output with a frequency N times larger than that of the reference input so there is no detected phase error by PLL 106 between reference clock signal and the N times frequency divided data clock signal 103. The value of N is conventionally a positive integer greater than one but may also be rational fractions. PLL 106 may further include a bias voltage generator, among other known components for PLLS. Accordingly, many known details regarding PLL 106 are not included for purposes of clarity.

It should be appreciated that PLL 106 is to obtain a frequency lock with reference clock signal 123. Thus, data clock signal 103 has at least approximately the same frequency as that of reference clock signal 123. Additionally, it should be appreciated that PLL 106 is to obtain a proximal phase alignment between reference clock signal 123 and data clock signal 103. This proximal phase alignment is to be sufficient for purposes of a transmit mode to transmit data, where data clock signal 103, or more particularly data clock signal 103C output from PLL 106, is provided to PISO 104. Notably, CDR 105 includes a PLL where a shared VCO 216 is shared with PLL 106 and where divider 217 is bypassed.

If a receive mode is to be used, then all the above-mentioned signal processing to obtain data clock signal 103C is used as a first stage followed by second stage signal processing to refine data clock signal 103C to provide a more accurate phase aligned data clock signal 103F with respect to receive data signal 113.

For a receive mode, output from frequency divider 217 is provided to frequency comparator 225. Frequency comparator 225 is configured to compare frequency of reference clock signal 123 with output of frequency divider 217. Of course, this comparison accounts for the division by N of frequency of output from frequency divider 217. Frequency comparator 225 may be programmable to accept a threshold for such a comparison, for example whether the frequency of signal 123 divided by N is within a threshold percentage or frequency error with respect to frequency of the output from frequency divider 217. Additionally, frequency comparator 225 may be programmed to compare other signal attributes between two signals, for example hysteresis. However, for purposes of clarity, it is assumed that frequency comparator 225 has a fixed threshold to determine whether frequency of reference clock signal 123 has been sufficiently isolated by PLL 106 for purposes of refining for phase alignment.

In response to frequency of reference clock signal 123 being sufficiently isolated by PLL 106 for purposes of refining for phase alignment, frequency comparator 225 sends an enable signal 228 to activate charge pump 223 and sends a disable signal 229 to deactivate charge pump 213. CDR 105 is thus activated, and PLL 106 is thus deactivated though data clock signal 103 from VCO 216 is still active.

CDR 105 receives receive data signal 113 to amplifier ("AMP") 221. AMP 221 amplifies receive data signal 113 and provides an amplified receive data signal 113 to phase comparator 222 and to data sampler 205. Phase comparator receives data clock signal 103, and compares phase of amplified receive data signal 113 to phase of data clock signal 103. Phase comparator 222 has a higher degree of phase resolution than that of phase and frequency detector 212. In response to output from phase comparator 222, charge pump 223 increases or decreases signal voltage output or gain provided to node 234. Node 234 acts as a wired OR, and as charge pump 213 is deactivated, charge pump 223 output is provided to loop filter 214, and a filtered version of charge pump 223 output is provided to VCO 216. Data clock signal 103 output from VCO 216 is fed back to phase comparator 222 for refinement of phase alignment. Thus, CDR 105 is configured to provide data clock signal 103 to data sampler 205 for sampling receive data signal 113 to provide as output receive data signal(s) 114, as previously described. Though a charge pump is described above, a transconductor may be used in place of a charge pump, for example charge pump 223.

Figure 3A:
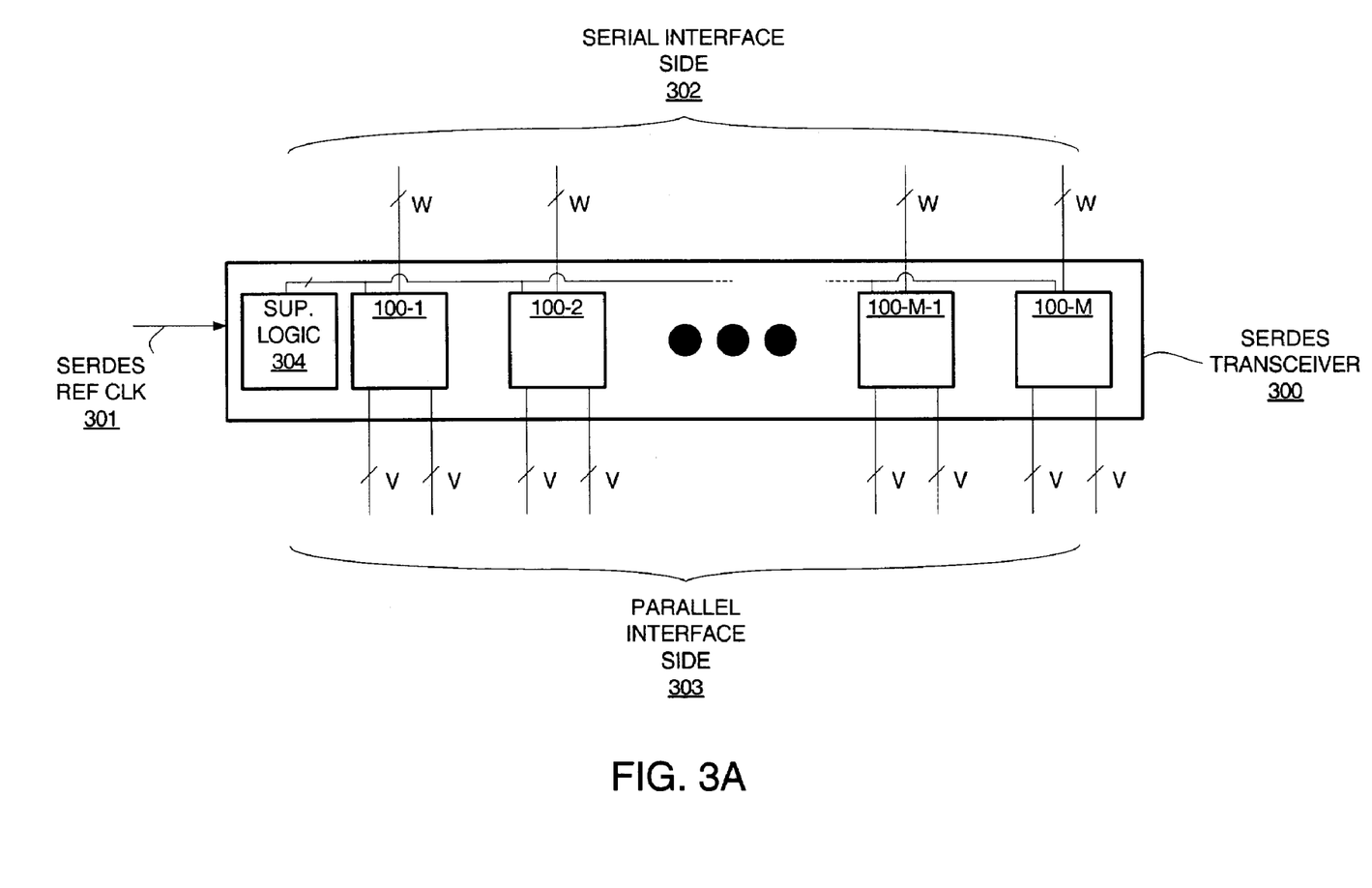
FIG. 3A is a block diagram depicting an exemplary embodiment of a serializer-deserializer ("SERDES") transceiver integrated circuit.

FIG. 3A is a block diagram depicting an exemplary embodiment of a serializer-deserializer transceiver integrated circuit ("SERDES") 300. SERDES 300 includes M bidirectional transceiver cells 100 (e.g., 100-1, 100-2, 100-M), for M a positive integer, and dedicated support logic 304. Though bidirectional transceiver cells 100 are illustratively shown, bidirectional transceiver cells 120 may be used, or a combination of both bidirectional transceiver cells 100 and 120 may be used.

Bidirectional transceiver cells 100 are clocked responsive to a SERDES reference clock signal 301. Dedicated support logic 304 is coupled to bidirectional transceiver cells 100 and is configured to select a portion of the M bidirectional transceiver cells 100 to be receivers or input cells and another portion of the M bidirectional transceiver cells 100 to be transmitters or output cells. In implementation, the size of the respective portions of M will depend on the number of inputs and outputs to be used for respective interfaces, where M is at least equal to the total of input and output interfaces.

On a serial interface side 302, input of width W, for W a positive integer greater than zero, is provided to an input portion of bidirectional transceiver cells 100 for providing corresponding output of width V, for V a positive integer greater than W, on a parallel interface side 303. On a parallel interface side 303, input of width V is provided to an output cell portion of bidirectional transceiver cells 100 for providing corresponding output of width W on a serial interface side 302.

Figure 3B:
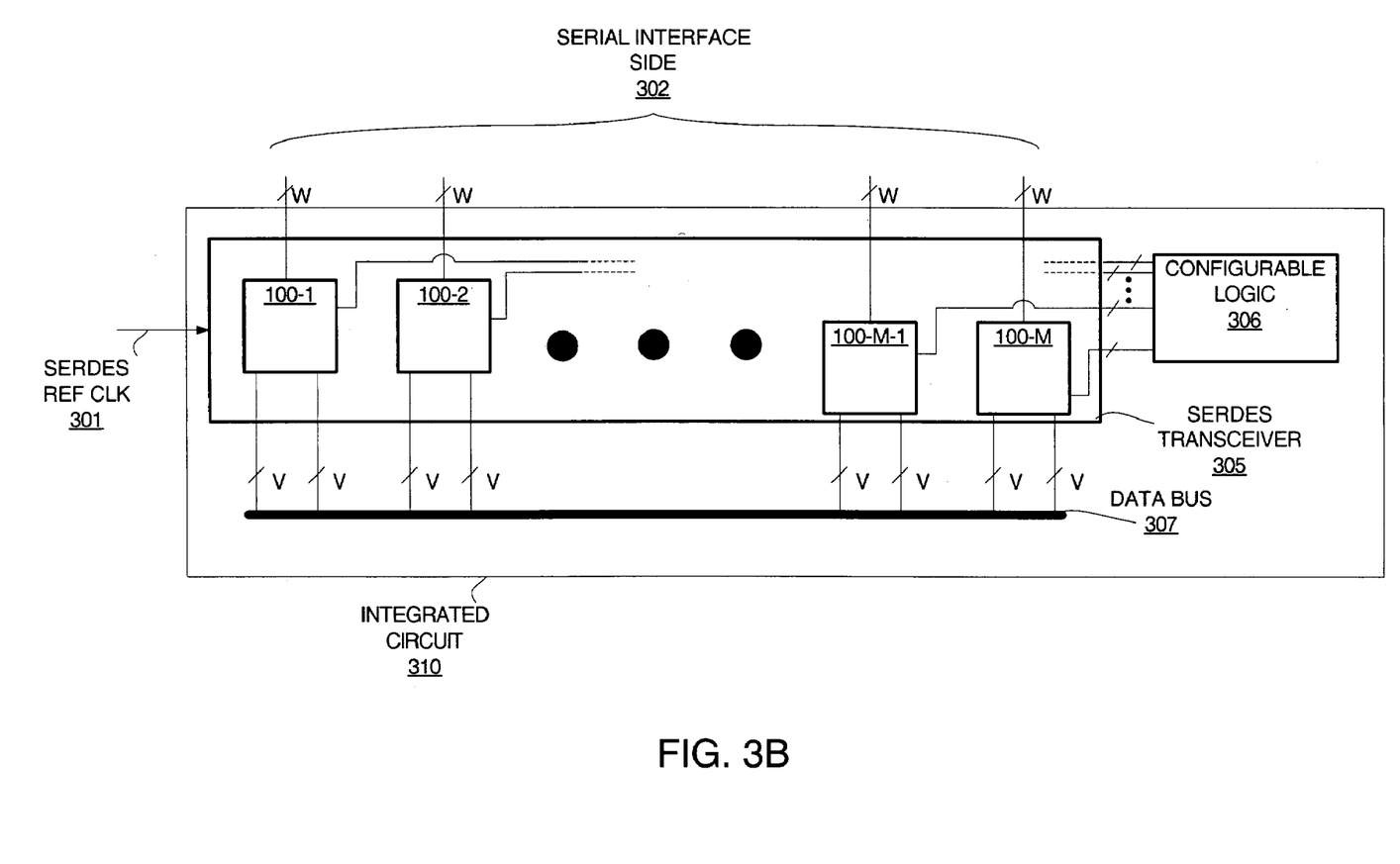
FIG. 3B is a block diagram depicting an exemplary embodiment of a SERDES transceiver of an integrated circuit having configurable logic.

FIG. 3B is a block diagram depicting an exemplary embodiment of a SERDES 305 of an integrated circuit 310 having configurable logic 306. As much of the description for integrated circuit 310 is the same as that for SERDES 300, it is not repeated. However, rather than having dedicated support logic 304 of FIG. 3A, integrated circuit 310 has configurable logic 306 for configuring bidirectional transceiver cells 100, as previously described, for either transmission or reception. Additionally, with configurable logic 306, bidirectional transceiver cells 100 may be reconfigured for either transmission or reception.

Figure 3C:
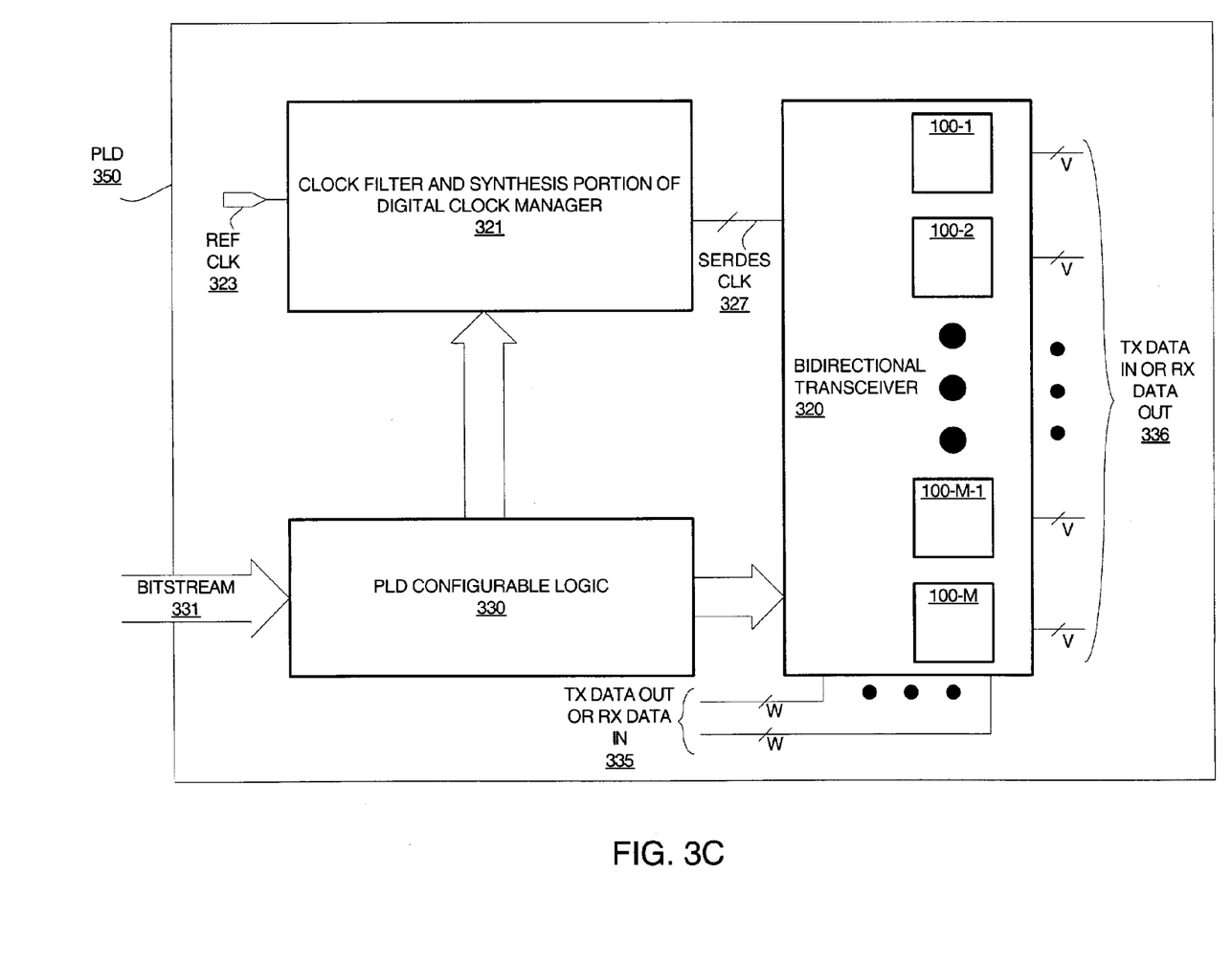
FIG. 3C is a block diagram depicting an exemplary embodiment of a SERDES transceiver of a programmable logic device ("PLD") integrated circuit having configurable logic.

FIG. 3C is a block diagram depicting an exemplary embodiment of a SERDES transceiver or bidirectional transceivers 320 of a programmable logic device ("PLD") integrated circuit 350 having configurable logic 330. As much of the description for integrated circuit 330 is the same as that for SERDES 300 and integrated circuit 310, it is not repeated.

PLD 350 includes a clock filter and synthesis portion of a digital clock manager ("DCM") 321, bidirectional transceivers 320 and configurable logic 330. Bidirectional transceivers 320 include M bidirectional transceiver cells 100 for providing a transmit data in or receive data out interface 336 and a transmit data out or receive data in interface 335. A reference clock 323, which may be obtained from an external clock source, is provided to DCM 321 for providing one or more SERDES clock signals 327, such as transmit and receive clock signals, for operation of bidirectional transceiver cells 100.

A configuration bitstream 331 may be provided to configurable logic 330. Configurable logic 330 may be configured with configuration bitstream 331 to select one or more of filtration, multiply and divide for providing one or more SERDES clock signals 327. Additionally, configurable logic 330 may be configured with configuration bitstream 331 to select a portion of the M bidirectional transceiver cells 100 to be transmitters and another portion of the M bidirectional transceiver cells 100 to be receivers. Furthermore, this selection may be redone to select different portions by providing another configuration bitstream 331. Moreover, configuration bitstream 331 may be provided to PLD 350 during operation, and thus such reconfiguration of bidirectional transceiver cells 100 may be done while PLD is in an operational mode, namely, "on-the-fly" reconfiguration. Thus, for example, a bidirectional transceiver cell 100 may be configured as a transmitter for one operational mode of PLD 350 and then reconfigured as a receiver for another operation mode of PLD 350, and vice versa.

Figure 4:
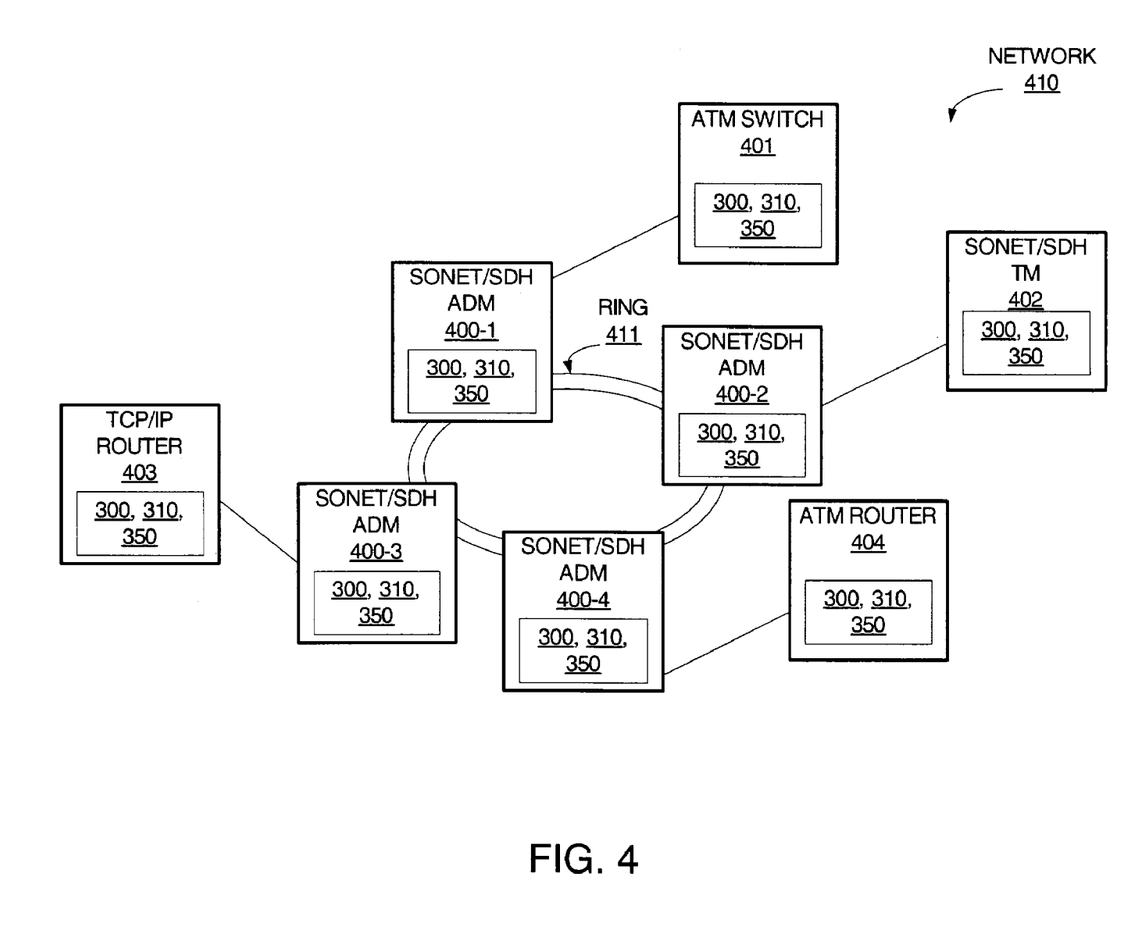
FIG. 4 is a block diagram depicting an exemplary embodiment of a network having at least one of the integrated circuits of FIGS. 3A, 3B and 3C.

FIG. 4 is a block diagram depicting an exemplary embodiment of a network 410 having at least one of integrated circuits 300, 310 and 350 of FIGS. 3A, 3B and 3C, respectively. Network 410 includes a plurality of Synchronous Optical Network ("SONET") or Synchronous Digital Hierarchy ("SDH") add/drop multiplexers ("ADMs") 400-1, 400-2, 400-3 and 400-4 (collectively "ADMs 400"), coupled to one another via an optical networking ring network topology ("ring") 411. One or more of ADMs 400 includes at least one of integrated circuits 300, 310 and 350. Additionally, other nodes of network 410, such as nodes 401, 402, 403 and 404, may include at least one of integrated circuits 300, 310 and 350. For example, an Asynchronous Transfer Mode ("ATM") switch 401 may be coupled to ADM 400-1 via one or more of integrated circuits 300, 310 and 350 on one or both sides of electrical communication therebetween. For example, a SONET/SDH terminal multiplexer ("TM") 402 may be coupled to ADM 400-2 via one or more of integrated circuits 300, 310 and 350 on one or both sides of electrical communication therebetween. For example, Transmission Control Protocol/Internet Protocol ("TCP/IP") router 403 may be coupled to ADM 400-3 via one or more of integrated circuits 300, 310 and 350 on one or both sides of electrical communication therebetween. Lastly, for example, ATM router 404 may be coupled to ADM 400-4 via one or more of integrated circuits 300, 310 and 350 on one or both sides of electrical communication therebetween.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Any and all trademarks are the respective property of their owners.

The invention claimed is:

1. A bidirectional transceiver, comprising:
 a transmit data path;
 a receive data path coupled to the transmit data path at an input/output node, the input/output node being common to the receive data path and the transmit data path as a location of reception and transmission of data; and
 a phase-locked loop coupled between the transmit data path and the receive data path to provide a first timing signal to each of the transmit data path and the receive data path;
 wherein the transmit data path and the receive data path are for at least multi-gigabit data rates, the bidirectional transceiver cell configured to act either as a transmitter or a receiver.

2. The bidirectional transceiver, according to claim 1, wherein the receive path comprises a clock-data recovery circuit.

3. The bidirectional transceiver, according to claim 2, wherein the clock-data recovery circuit comprises another phase-locked loop, the other phase-locked loop being a phase trim unit of the phase-locked loop.

4. The bidirectional transceiver, according to claim 3, wherein the phase-locked loop and the other phase-locked loop share a voltage controlled oscillator, and further comprising a frequency comparator coupled to receive a reference clock and configured to selectively and inversely enable the phase-locked loop and the other phase-locked loop.

5. The bidirectional transceiver, according to claim 4, wherein the phase-locked loop and the other phase-locked loop share a loop filter.

6. The bidirectional transceiver, according to claim 1, wherein the receive data path is coupled to the transmit data path at another input/output node used to provide a reference voltage for voltage differential signaling.

7. The bidirectional transceiver, according to claim 1, wherein the transmit data path comprises a parallel-to-serial converter and a tri-state output buffer, the parallel-to-serial converter coupled to receive a data clock output signal from the phase-locked loop and to receive transmit data in parallel, the tri-state output buffer coupled to the parallel-to-serial converter to receive transmit data in serial.

8. The bidirectional transceiver, according to claim 7, wherein the receive data path comprises a tri-state input buffer and clock-data recovery circuitry.

9. The bidirectional transceiver, according to claim 8, wherein the clock-data recovery circuitry comprises another phase-locked loop a portion of which is coupled between the transmit data path and the receive data path, the other phase-locked loop being a phase trim unit of the phase-locked loop.

10. The bidirectional transceiver, according to claim 9, wherein the other phase-locked loop shares a voltage controlled oscillator with the phase-locked loop.

11. The bidirectional transceiver, according to claim 10, wherein the clock-data recovery circuitry receives serial data received and recovers parallel data received from the serial data received responsive to a second timing signal from the other phase-locked loop, the second timing signal being a refinement of the first timing signal, the first timing signal being provided from the phase-locked loop.

12. The bidirectional transceiver, according to claim 11, wherein the first timing signal and the second timing signal are provided from the voltage controlled oscillator.

13. The bidirectional transceiver, according to claim 12, wherein the parallel data received is provided to a demultiplexer.

14. The bidirectional transceiver, according to claim 12, wherein the parallel data received is provided to a first-in first-out buffer.

15. The bidirectional transceiver, according to claim 11, wherein the first timing signal is obtained from a multiplexer, the multiplexer coupled for input of receive and transmit timing signals from which the first timing signal is selected.

16. The bidirectional transceiver, according to claim 1, further comprising a first data cross-connect and a second data cross connect for respectively cross-connecting data signals for transmit and receive modes.

17. The bidirectional transceiver, according to claim 16, further comprising a first-in, first-out buffer for both the transmit and receive modes.

18. A serializer-deserializer (SERDES) transceiver, comprising:
bidirectional transceiver cells, each bidirectional transceiver of the bidirectional transceiver cells having an input/output node, a transmitter and a receiver, the transmitter and the receiver sharing a phase-locked loop, the input/output node being common to both the transmitter and receiver as a location of reception and transmission of data, wherein each of the bidirectional transceiver cells is configurable to either transmit or receive for at least multi-gigabit data rates.

19. The SERDES transceiver, according to claim 18, further comprising configurable logic coupled to the bidirectional transceiver cells, the configurable logic configurable for selecting which of the bidirectional transceiver cells are input data cells and which of the bidirectional transceiver cells are output data cells.

20. The SERDES transceiver, according to claim 19, wherein the configurable logic is a portion of a programmable logic device.

21. The SERDES transceiver, according to claim 18, wherein the bidirectional transceiver cells are disposed in a network device.

22. The SERDES transceiver, according to claim 21, wherein the network device is selected from an add/drop multiplexer, a router, a switch and a terminal multiplexer.

23. The SERDES transceiver, according to claim 22, wherein at least one of the add/drop multiplexer and the terminal multiplexer is one of a Synchronous Digital Hierarchy network device and a Synchronous Optical Network device.

24. The SERDES transceiver, according to claim 22, wherein at least one of the router and the switch is an Asynchronous Transfer Mode network device.

25. The SERDES transceiver, according to claim 22, wherein the router is a Transmission Control Protocol/Internet Protocol network device.

26. The SERDES transceiver, according to claim 18, wherein the transmitter and the receiver share a first-in, first-out buffer.

27. A method for configuring an integrated circuit having configurable logic, comprising:
providing a plurality of bidirectional transceiver cells with the integrated circuit;
providing a bitstream to configure the configurable logic; and
configuring the configurable logic to select for transmit data paths a first portion of the plurality of bidirectional transceiver cells and to select for receive data paths a second portion of the plurality of bidirectional transceiver cells, the transmit data paths and the receive data paths respectively having input/output nodes, the input/output nodes being respectively common to both the transmit data paths and the receive data paths, the input/output nodes being respective locations of reception and transmission of data;
wherein the transmit data paths and the receive data paths are for at least multi-gigabit data rates.

28. The method, according to claim 27, further comprising configuring the configurable logic to select different portions for the first portion and the second portion while the integrated circuit is in an operative mode.

* * * * *